United States Patent [19]
Jamieson

[11] 3,848,166
[45] Nov. 12, 1974

[54] SILICON CONTROLLED RECTIFIER TYPE INVERTER FOR ELECTRIC MOTORS

[75] Inventor: Joseph Jamieson, Plantation, Fla.

[73] Assignee: Louis W. Parker, Ft. Lauderdale, Fla.

[22] Filed: Jan. 22, 1973

[21] Appl. No.: 325,785

[52] U.S. Cl. .............................. 318/227, 321/45 R
[51] Int. Cl. ......................... H02p 5/28, H02p 7/40
[58] Field of Search ................. 321/45 R, 45 C, 36; 318/227

[56] References Cited
UNITED STATES PATENTS

| | | | |
|---|---|---|---|
| 1,946,292 | 2/1934 | Mittag | 321/36 |
| 2,456,204 | 12/1948 | Loughren | 321/36 |
| 3,242,352 | 3/1966 | Long | 321/45 C |
| 3,315,144 | 4/1967 | Poss | 321/45 R X |
| 3,599,078 | 8/1971 | Pelly et al. | 321/45 C X |

FOREIGN PATENTS OR APPLICATIONS

| | | | |
|---|---|---|---|
| 258,442 | 4/1970 | U.S.S.R. | 321/45 C |

Primary Examiner—William M. Shoop
Attorney, Agent, or Firm—Elliott I. Pollock

[57] ABSTRACT

The current through a load, e.g., the stator coil of a synchronous type electric motor, is periodically reversed in direction by an inverter employing a plurality of silicon controlled rectifiers (SCR's). The SCR's are associated with one another in pairs, at opposing ends of the load respectively; and the direction of current flow through the load is controlled by rendering a selected pair of SCR's conductive, to effect current flow through the load or stator coil in a first direction, and by then shutting off the current flow through said selected pair and rendering a different pair of SCR's conductive to effect current flow in the opposite direction through said load. Current flowing through a selected pair of SCR's is shut off by connecting a charged capacitor across one of the conducting SCR's in said selected pair, the capacitor charge polarity being such as to initially promote current flow therethrough. Connection of the charged capacitor in this fashion effects a reversal of the charge polarity across the capacitor; and the reversely charged capacitor is thereafter connected across a conducting SCR in the other of said SCR pairs when it is desired to interrupt current flow through said other pair of SCR's.

14 Claims, 5 Drawing Figures

PATENTED NOV 12 1974
3,848,166
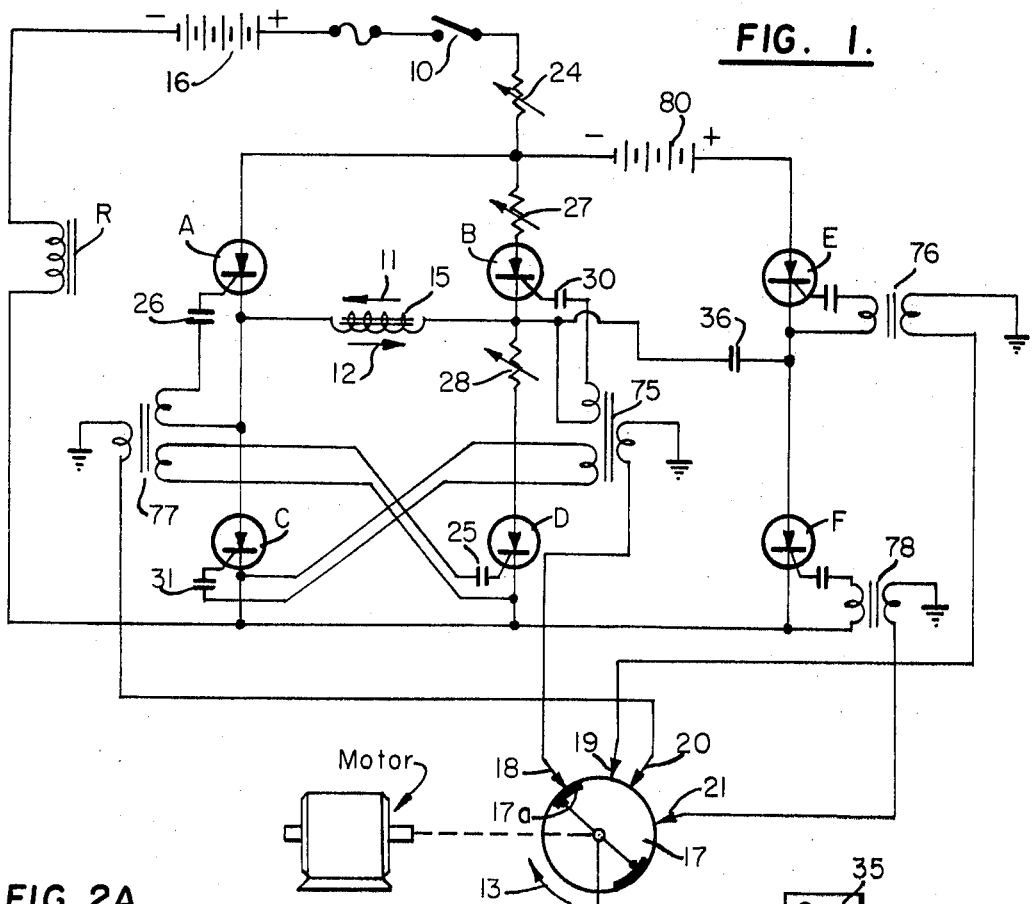
FIG. 1.
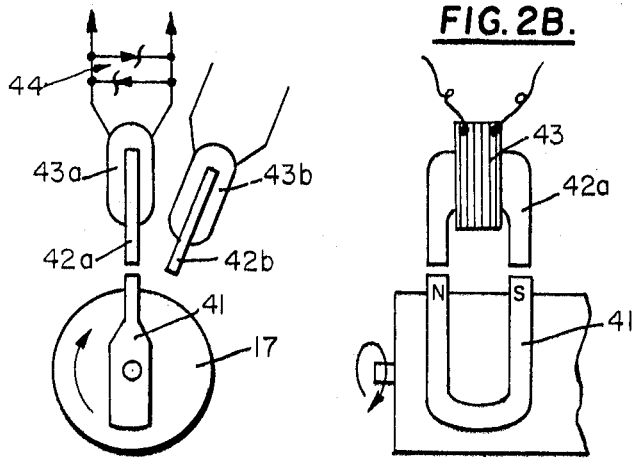
FIG. 2A.
FIG. 2B.
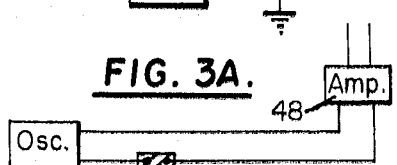
FIG. 3A.
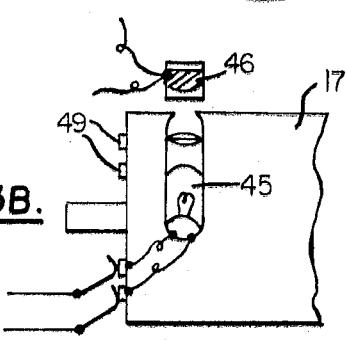
FIG. 3B.

SILICON CONTROLLED RECTIFIER TYPE INVERTER FOR ELECTRIC MOTORS

BACKGROUND OF THE INVENTION

Parker U.S. Pat. Nos. 2,479,589, 3,296,475 and 3,567,978 describe axial airgap motors wherein a magnetic field passes through rotor and stator elements of the motor in a direction parallel to the motor shaft. The motor comprises stator and rotor coils so arranged that if a direct current is passed through both coils there will be either an attraction or repulsion between the poles thereof, so as to deliver a torque to the rotor shaft when the poles are in proper relative position. In order that the torque may result in continuous rotation, it is necessary that the current through the stator coil, for example, be periodically reversed; and this reversal should take place at a well defined point where the stator and rotor elements are properly positioned relative to one another.

The present invention is concerned with an inverter circuit for use with motors of the aforesaid type, arranged to effect a periodic reversal in the direction of current flowing through, for example, the stator coils. The combination of the inverter and motor is useful in a variety of different applications, and finds particular utility in motor vehicles of the electric type.

In order to effect the current reversal described above, the present invention contemplates the provision of an improved inverter circuit employing an array of silicon controlled rectifiers (hereinafter referred to as SCR's). Control circuits of this general type are known in the art. See for example Chandler U.S. Pat. No. 3,593,103, Madurski U.S. Pat. No. 3,577,049, and Schmidt U.S. Pat. No. 3,097,355. Known circuits rely upon the well known principle that an SCR can easily be made to conduct by applying a few volts on its control electrode, and can be made to discontinue conduction by interrupting current flow through it for at least 70 microseconds. The techniques employed in prior systems, however, do not find practical application in the environments contemplated by the present invention.

More particularly, when an SCR inverter is employed to control current flow through an axial airgap machine, the inverter may be required to interrupt currents as high as 200 amperes at 240 volts, and may have to effect a reversal of such currents at a rate of 60 or more times per second. The aboveidentified Chandler patent uses a mechanical make-and-break arrangement, or commutator, to stop current flow; and such a device, when operating at the heavy currents contemplated by the present invention, would soon burn up. The present invention, recognizing this major problem in the prior art, is accordingly concerned with an SCR type inverter which employs a quite different technique for shutting off a conducting SCR, and which assures rapid and accurate control of current flow even in relatively high load situations, thereby making the overall system practical for use in the motor application described previously, and in other high power and/or heavy load applications which will be apparent to those skilled in the art.

SUMMARY OF THE INVENTION

The inverter of the present invention is of the bridge-type and comprises, in its preferred form, four SCR's, two of which have their cathodes connected to opposing ends of a load respectively, and the other two of which have their anodes connected to opposing ends of said loads respectively. When a selected pair of the SCR's, connected to opposing ends of the load respectively, are rendered conductive, current flows through the load in a given direction; and the direction of current flow may be reversed through said load by interrupting current flow through said selected pair of SCR's and by thereafter rendering the other pair of SCR's conductive.

The SCR's in a selected pair are rendered conductive by coupling a control signal to the gate electrodes of said selected pair. This can be effected, in accordance with the present invention, by a mechanical commutator and brush arrangement, or by a magnetic commutator arrangement, or by a photoelectric commutator; and each of these embodiments of the invention is described hereinafter. In each case, the commutator applies a control signal to the gate electrodes of a first pair of SCR's to render them conductive; thereafter, at a later point in time, activates a control circuit which interrupts current flow through said selected pair of rectifiers; and thereafter, at a still later point in time, applies the control signal to the SCR's comprising the other pair. By this repetitive sequence of operations, the current flowing through a load associated with the pairs of rectifiers is periodically reversed in direction.

A particularly important aspect of the invention resides in the method of control which is employed, and in the control circuit which is selectively activated, to interrupt current flowing through the conducting SCR, or pair of SCR's. This control method and circuit utilizes a comparatively large capacitor which is associated with a switching mechanism (e.g., another SCR) operative to selectively place the capacitor across a conducting SCR to short circuit that rectifier. Such a short circuiting operation is, in itself, adequate to effect the desired control at comparatively low power levels; however, it does not achieve the desired certainty of operation when the circuits are operating at high power inputs. Accordingly, in the system of the present invention the capacitor is preferably charged prior to being shunted across the SCR which is to be controlled, with the capacitor charge being of such polarity as to initially add to the current flowing through the capacitor when said capacitor is connected across the SCR. After the capacitor has been connected across the conducting SCR, it becomes charged in the opposite direction thereby, in effect, reversing the polarity of the current across the SCR. This same capacitor, now reversely charged, can thereafter be placed across another SCR which makes use of the reverse polarity charge in the same fashion; and the capacitor charge is then again reversed to permit the capacitor to control conduction through the first-mentioned SCR. By alternatively connecting the charged capacitor across one or the other SCR in the aforementioned pairs of SCR's, therefore, the current flow through the two pairs of SCR's is alternately interrupted in a very efficient and positive manner, even at high power inputs and under high load conditions.

BRIEF DESCRIPTION OF THE DRAWINGS

FIG. 1 is a schematic diagram of an inverter circuit constructed in accordance with a preferred embodiment of the present invention;

FIG. 2A is an end view, and FIG. 2B is a side view of a magnetic type commutator arrangement which may be substituted for the brush-type commutator of FIG. 1; and FIG. 3A is an end view, and FIG. 3B is a side view of a photoelectric commutator which may be employed in the present invention.

DESCRIPTION OF THE PREFERRED EMBODIMENTS

The invention will now be described in reference to its use with an axial airgap motor. As mentioned previously, however, the basic principles of the present invention can be used in other environments for controlling the conduction of a SCR in circuits used for other purposes, and can be used in conjunction with conventional type synchronous motors.

In FIG. 1 the element 15 is intended to represent a load, taking the form of a coil or set of coils comprising a portion of a motor. For purposes of the subsequent description, it is assumed that coil 15 is a stator coil, that it is wound on an appropriate pole fabricated of magnetic material, that there is a corresponding rotor R adjacent thereto; and that the rotor R also carries a somewhat similar coil winding which has a direct current passing through it, e.g., from source 16. It will be understood that, if a direct current is passed through both the stator and rotor coils, there will be an attraction or repulsion between the two poles, and a torque will be delivered to the rotor shaft when the poles are in proper position relative to one another. In order that this torque may result in continuous rotation, it is necessary that the current through stator coil 15 be periodically reversed and that this reversal take place at an appropriate point in time when the stator and rotor are properly positioned relative to one another.

Current flow through coil 15, and the direction of said flow, is controlled by a bridge-type inverter circuit comprising a plurality of SCR's A,B, C and D connected to one another and to opposing ends of coil 15 as illustrated, and adapted to cooperate with one another in pairs. More particularly, SCR's A and B have their cathodes connected to opposing ends of the coil 15, and have their anodes connected together to one another and, via an on-off switch 10 and a fuse, to one side of an appropriate power source depicted as battery 16. A further pair of SCR's C and D have their anodes connected to the opposing ends of coil 15, and have their cathodes connected together to the other side of source 16. If SCR's B and C are rendered conductive, while SCR's A and D are nonconducting, current from battery 16 will pass through SCR's B and C to effect a current flow through coil 15 in the direction indicated by arrow 11. If SCR's B and C should now be shut off, and SCR's A and D rendered conductive, current will pass in the reverse direction through coil 15, as indicated by arrow 12. By continually reversing the pair of SCR's which is conductive, and by effecting these conductivity reversals at proper positions of the rotor, continuous rotation of the rotor will result (assuming, of course, that the rotor inertia is sufficient to carry the rotor through the positions where current is momentarily disconnected).

The present invention is particularly concerned with a novel method and apparatus for rendering the various SCR's conductive, and nonconductive, at proper times, and for assuring that the states of conduction of the SCR's are properly controlled even under extremely heavy load or high power input conditions. The SCR's are rendered conductive by a commutating arrangement wherein a control signal is supplied, at proper times, to the gate electrode of the SCR's which are to be rendered conductive. A variety of different commutating arrangements will be described hereinafter, but other arrangements may be readily substituted without departing from the principles of the present invention. The SCR's are rendered nonconductive, at appropriate times, by a switching arrangement, also controlled by the commutating arrangement, operative to connect a comparatively large capacitor, preferably in a charged condition, across a conducting SCR.

Referring more particularly to FIG. 1, let us assume that the commutating arrangement comprises a commutator 17 mounted on the rotor shaft and having a pair of diametrically opposed narrow conductive segments, such as 17a, which are adapted to make momentary connection with brushes 18, 19, 20 and 21, in sequence, as said commutator 17 rotates. Let us further assume that, at the start of operation, switch 10 is closed, that all of the SCR's A-D inclusive are nonconducting, and that commutator segment 17a is approaching brush 18. When segment 17a engages brush 18, the alternating current output of an oscillator 35 will be coupled via commutator segment 17a and brush 18 to the primary of a transformer 75, and will produce a signal in the secondary windings of said transformer 75 which are connected, via capacitors 30 and 31, to the control electrodes of rectifiers B and C. The purpose of capacitors 30 and 31 (as well as of capacitors 25 and 26 to be described hereinafter) is to supply a pulse to the control electrode of the SCR's with which they are associated, but to cut off any substantial flow of current out of these control electrodes. Oscillator 35 may have any suitable frequency, but preferably operates in the audio frequency range.

The engagement of the commutator segment with brush 18, and the resultant coupling of signals via capacitors 30 and 31 to the control electrodes of rectifiers B and C, causes SCR's B and C to become conducting. A dc current will accordingly flow through coil 15 in the direction of arrow 11. As the commutator continues to rotate in the direction of arrow 13, segment 17a will break its connection with brush 18 and the control signal applied to the control electrodes of rectifiers B and C will accordingly cease. This will not, however, change the operating condition of SCR's B and C, i.e., the SCR's will continue to conduct.

As commutator 17 continues to rotate, segment 17a next engages brush 19. A signal is now applied from oscillator 35 via commutator segment 17a and brush 19 to the primary winding of a transformer 76; and the resultant signal appearing across the secondary winding of transformer 76 will now render a further silicon controlled rectifier E conductive. SCR-E has its anode connected to the common anode junction of rectifiers A and B, and has its cathode connected to one side of a fairly large capacitor 36, the other side of which is connected to the side of load 15 associated with the cathode of SCR-B and with the anode of SCR-D. When SCR-E is rendered conductive, it functions as a switching mechanism which shunts capacitor 36 across SCR-B and, when this happens, capacitor 36 acts momentarily as a short circuit across SCR-B to render it nonconductive. Interruption of current flow through SCR-B automatically breaks off the current flow through SCR-C as well. After a short period of time, the current flow from SCR-E through capacitor 36 will cause the capacitor to become charged; and, as a result, current flow through said capacitor will stop, thereby breaking off further conductivity of SCR-E.

By the sequence of operations described above, therefore, when commutator segment 17a engages brush 19, capacitor 36 is shunted across SCR-B to shut off current flow through SCR's B and C; capacitor 36 becomes charged; and the conduction of switching SCR-E is automatically terminated.

As commutator 17 continues to rotate in the direction of arrow 13, segment 17a next engages brush 20. The signal from oscillator 35 is accordingly now coupled via commutator 17 and brush 20 to the primary of a transformer 77 and then, from the secondary windings of said transformer, is coupled via capacitors 26 and 25 to the control electrodes of SCR's A and D respectively. Current now commences flowing through SCR's A and D via coil 15 and, at this time, passes through said coil in a direction 12 which is the reverse of the previous direction of current flow. When segment 17a leaves brush 20, the signal from oscillator 35 is, as before, no longer effective to couple control signals to the gate electrodes of SCR's A and D, but these two rectifiers again continue to conduct until they are shut off.

When the commutator segment 17a reaches brush 21, the signal from oscillator 35 is coupled to the primary winding of a transformer 78 and, in a manner similar to that described with reference to SCR E, now renders a further switching SCR-F conductive to shunt capacitor 36 across conducting SCR-D. Due to the earlier sequence of operations already described, capacitor 36 is already charged; and the charge polarity is such that, when capacitor 36 is now connected across rectifier D, its charge tends to add to the current flow through capacitor 36 thereby making the break-off of SCR-D more reliable. Capacitor 36 then becomes charged in the opposite direction (in effect reversing the polarity of the current across the SCR-D), thereby preparing the capacitor 36 for later connection across SCR B with an appropriate polarity which would tend to promote the passage of current through capacitor 36 when it is so connected across SCR-B. The new charge accumulated by capacitor 36 shuts off SCR-F in the fashion described earlier with respect to SCR-E.

Each of the SCR's B and D, when it conducts, is thus rendered nonconductive by shunting the same capacitor 36, in a charged condition, across it. The capacitor charge polarity is such that, when the capacitor is first connected across the SCR being shut off, it tends to add to the current flow through the capacitor whereafter the capacitor becomes charged in the opposite direction. The reversely charged capacitor is subsequently placed across the other SCR, which makes use of the reverse polarity charge in the same way as the first SCR, and which then again reverses the capacitor charge polarity to permit repetition of the control cycle.

To assure that the control operation is properly initiated, it may be desirable to include resistors 27 and 28 in the circuit. These resistors increase the effective impedance of SCR's B and D respectively, and help assure that, when capacitor 36 is shunted across one of said SCR's, the current will encounter a lower impedance through capacitor 36 than through the associated SCR. After the inverter is in operation, the magnitude of resistors 27 and 28 may be reduced to zero to eliminate any power losses which they may create, i.e., the resistors may be shorted out by any appropriate means, including automatic means. Variable resistor 24 may also be included in the circuit to provide a speed control. In addition, to increase the charge in capacitor 36, additional potential may be supplied by a battery 80. This improves the shut off of SCR's B and D.

The motor described in the foregoing delivers torque in pulses and accordingly, in certain positions of the rotor, it would not self-start. To remedy this, another similar rotor-stator system should be connected to the described system, with the additional system being so arranged that the zero torque position of one system corresponds to the high torque position of the second system. In the same way even more similar systems, interconnected to one another, can be added out of phase with one another to reduce the torque fluctuation.

Instead of using a commutator and brushes, other types of commutating arrangements can be employed. One alternative, employing magnetic principles, is illustrated in FIGS. 2A and 2B. In this particular arrangement, the commutator 17 supports a permanent magnet 41 which is positioned to pass a plurality of laminated iron stacks 42a, 42b, etc. The laminated stacks may be suitably mounted on the brush holder used previously (in the FIG. 1 arrangement), and each stack has a coil winding 43a, 43b, etc., thereon. As the magnet 41 passes one of the stacks, the sudden increase and decrease of the magnetic field through that stack creates a voltage surge in its associated coil; and this surge may be used to break down the resistance of the SCR's in the same fashion as was done previously by the output of oscillator 35. In order to get the motor started, the brushes shown in FIG. 1 are still necessary; but after a moderate speed has been reached, the brushes may be lifted (preferably by an automatic device) whereafter the outputs of the several coils 43a, 43b, etc., can be used to continue the operation of the system.

Inasmuch as the voltage output from coils 43a, 43b, etc., may rise to too high a value resulting in damage to the SCR's, zener diodes 44 are preferably connected across said coils. The diodes, as is well known, commence conduction at a predetermined value of voltage, and thereby operate to limit the amplitude of the pulses which are supplied from said coils. The coils 43 can be connected in parallel with the primary coils of transformers 75, 76, 77 and 78, previously described in reference to FIG. 1, so that they may supply the necessary starting pulses when the brushes are lifted from the commutator.

Another commutating arrangement for obtaining the desired starting pulses is shown in FIGS. 3A and 3B. In this particular arrangement, a lamp 45 is mounted on the commutator 17, and is energized via brushes riding on slip rings 49, to illuminate a photocell 46 when the lamp is optically aligned with said photocell during rotation of the commutator. Photocell 46 is of the type that reduces its resistance when illuminated. The photocell 46 is disposed in series with the output of oscillator 35, and when it is illuminated it permits the oscillator output to feed to amplifier 48. The resultant ac output from amplifier 48 may be applied to the transformers previously described in reference to FIG. 1, and will accordingly perform the functions of the brushes already described in reference to FIG. 1.

While I have thus described preferred embodiments of the present invention, many variations will be apparent to those skilled in the art. It must therefore be emphasized that the foregoing description is intended to be illustrative only and not limitative of my invention; and all such variations and modifications as are in accord with the principles described are meant to fall within the scope of the appended claims.

Having thus described my invention, I claim:

1. In combination, an electric motor having a rotor and at least one stator coil, a bridgetype current inverter connected to said motor, said inverter comprising first and second pairs of silicon controlled rectifiers connected to said stator coil of said motor, said first pair of rectifiers being poled in like direction to one another and in opposite direction to said second pair of rectifiers relative to said stator coil whereby conduction of said first pair of rectifiers effects current flow via said first pair in a first direction through said stator coil and conduction of said second pair of rectifiers effects current flow via said second pair in the opposite direction through said stator coil, said reversals in stator coil current flow direction cooperating with said rotor to produce a torque between said stator coil and rotor operative to effect rotary movement of said rotor, first control means coupled to each of the rectifiers in said first and second pairs of rectifiers for rendering alternate ones of said pairs of rectifiers conductive during alternate mutually exclusive periods of time, second control means operative during time intervals between said periods of time for shutting off the conducting pair of said rectifiers, said second control means including a capacitor, and selectively operable switch means for connecting said capacitor across one of the rectifiers in the conducting pair of said rectifiers, said first and second control means comprising a rotary commutator connected to the rotor of said motor and driven thereby, said commutator having a plurality of outputs which are energized at a rate and in a sequence determined by the rotation of said motor rotor, and means coupling said plurality of sequentially energized outputs to said switch means and to the gate electrodes of each of the rectifiers in said first and second pairs of rectifiers in a predetermined sequence to control the operating states of said switch means and rectifiers.

2. The combination of claim 1 including means for charging said capacitor, said switch means being operative to connect said charged capacitor across said one of said rectifiers in the conducting pair of said rectifiers.

3. The combination of claim 2 wherein one of said first pair of rectifiers has its cathode connected to one end of said motor stator coil and one of said second pair of rectifiers has its anode connected to said one end of said stator coil, one side of said capacitor being connected to said one end of said stator coil, said switch means including means for selectively connecting the other side of said capacitor to the anode of said one of said first pair of rectifiers or to the cathode of said one of said second pair of rectifiers.

4. The combination of claim 3 wherein said switch means comprises third silicon controlled rectifier means connected between the other side of said capacitor and the anode of said one of said first pair of rectifiers and fourth silicon controlled rectifier means connected between the other side of said capacitor and the cathode of said one of said second pair of rectifiers, said commutator including outputs coupled to the gate electrodes of said third and fourth silicon controlled rectifier means for rendering alternate ones of said third and fourth rectifier means conductive during alternate spaced time intervals.

5. The combination of claim 1 wherein said commutator comprises a rotary member affixed to the rotor shaft of said motor and having a plurality of brushes in mechanical engagement therewith.

6. The combination of claim 1 wherein said commutator comprises means producing a rotating magnetic field.

7. The combination of claim 1 wherein said commutator comprises a photoelectric commutator.

8. The combination of claim 1 wherein said commutator includes an audio frequency oscillator the output of which is sequentially connected to said commutator outputs.

9. The combination of claim 2 wherein said switch means is operative to connect said charged capacitor across said one of said rectifiers with an initial charge polarity which adds to the current flow from said conducting one of said rectifiers through said capacitor.

10. The combination of claim 1 wherein said motor rotor comprises a coil winding, and means for producing a unidirectional current flow through said rotor coil winding.

11. The combination of claim 1 wherein said motor rotor comprises a coil winding connected in series circuit with a unidirectional power source, said series circuit being connected across said bridge-type current inverter.

12. The combination of claim 11 wherein said series circuit includes a variable resistance for controlling the magnitude of current flow through said rotor coil winding.

13. The combination of claim 1 wherein said motor rotor comprises at least one coil winding connected to both of said pairs of rectifiers, conduction of said first pair of rectifiers being operative to effect current flow through said coil winding in the same direction as is effected through said coil winding by conduction of said second pair of rectifiers.

14. The combination of claim 1 wherein said inverter includes a variable resistance in series with at least one of said pairs of rectifiers for controlling the effective impedance of said one pair to current flow therethrough.

* * * * *